US010482021B2

United States Patent
Oportus Valenzuela et al.

(10) Patent No.: US 10,482,021 B2
(45) Date of Patent: Nov. 19, 2019

(54) PRIORITY-BASED STORAGE AND ACCESS OF COMPRESSED MEMORY LINES IN MEMORY IN A PROCESSOR-BASED SYSTEM

(71) Applicant: QUALCOMM Incorporated, San Diego, CA (US)

(72) Inventors: Andres Alejandro Oportus Valenzuela, Los Gatos, CA (US); Nieyan Geng, San Diego, CA (US); Christopher Edward Koob, Round Rock, TX (US); Gurvinder Singh Chhabra, San Diego, CA (US); Richard Senior, San Diego, CA (US); Anand Janakiraman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 15/193,001

(22) Filed: Jun. 24, 2016

(65) Prior Publication Data
US 2017/0371792 A1    Dec. 28, 2017

(51) Int. Cl.
*G06F 12/0871* (2016.01)
*G06F 12/0868* (2016.01)

(52) U.S. Cl.
CPC ...... *G06F 12/0871* (2013.01); *G06F 12/0868* (2013.01); *G06F 2212/1024* (2013.01);
(Continued)

(58) Field of Classification Search
CPC ........... G06F 2212/401; G06F 12/0802; G06F 2212/1044; G06F 2212/608;
(Continued)

(56) References Cited

U.S. PATENT DOCUMENTS 5,761,536 A    6/1998  Franaszek
6,519,733 B1   2/2003  Har et al.
(Continued)

FOREIGN PATENT DOCUMENTS

WO    2006009618 A2    1/2006

OTHER PUBLICATIONS

International Search Report and Written Opinion—PCT/US2017/035692—ISA/EPO—dated Aug. 8, 2017.

*Primary Examiner* — Hashem Farrokh
(74) *Attorney, Agent, or Firm* — MG-IP Law, P.C.

(57) ABSTRACT

In an aspect, high priority lines are stored starting at an address aligned to a cache line size for instance 64 bytes, and low priority lines are stored in memory space left by the compression of high priority lines. The space left by the high priority lines and hence the low priority lines themselves are managed through pointers also stored in memory. In this manner, low priority lines contents can be moved to different memory locations as needed. The efficiency of higher priority compressed memory accesses is improved by removing the need for indirection otherwise required to find and access compressed memory lines, this is especially advantageous for immutable compressed contents. The use of pointers for low priority is advantageous due to the full flexibility of placement, especially for mutable compressed contents that may need movement within memory for instance as it changes in size over time.

28 Claims, 7 Drawing Sheets

(52) U.S. Cl.
CPC ........... *G06F 2212/1044* (2013.01); *G06F 2212/281* (2013.01); *G06F 2212/282* (2013.01); *G06F 2212/313* (2013.01); *G06F 2212/401* (2013.01); *G06F 2212/608* (2013.01)

(58) Field of Classification Search
CPC ........... G06F 12/0871; G06F 12/0868; G06F 2212/601; G06F 2212/1024
See application file for complete search history.

(56) References Cited

U.S. PATENT DOCUMENTS

| | | |
|---|---|---|
| 6,856,651 B2 | 2/2005 | Singh |
| 7,181,457 B2 | 2/2007 | Reinauer et al. |
| 8,738,860 B1 | 5/2014 | Griffin et al. |
| 9,158,686 B2 | 10/2015 | Wegener |
| 2001/0038642 A1* | 11/2001 | Alvarez, II ............ H03M 7/30 370/477 |
| 2009/0112949 A1 | 4/2009 | Ergan et al. |
| 2014/0108731 A1 | 4/2014 | Sardashti et al. |
| 2016/0055094 A1* | 2/2016 | Patsilaras ............ G06F 12/0893 711/118 |
| 2017/0123978 A1* | 5/2017 | Krishnamurthy ... G06F 12/0802 |

\* cited by examiner

PRIORITY-BASED STORAGE AND ACCESS OF COMPRESSED MEMORY LINES IN MEMORY IN A PROCESSOR-BASED SYSTEM

FIELD OF THE DISCLOSURE

The technology of the disclosure relates generally storing and accessing data in computer memory, and more particularly to storing and accessing compressed high priority and low priority data in memory of a processor-based system.

BACKGROUND

Computing devices are prevalent in society. These devices may include servers, computers, cellular telephones, portable digital assistants ("PDAs"), portable game consoles, palmtop computers, and other electronic devices. Computing devices conventionally include a processor-based system that performs computational tasks in a wide variety of applications. The processor-based system may be included with other integrated circuits designed to work together in a system-on-a-chip ("SoC"), to deliver functionality to a user. A typical processor-based system includes one or more processors that execute software instructions. For example, some software instructions instruct a processor to fetch data from a location in a memory, perform one or more processor operations using the fetched data, and generate a stored result. As examples, software instructions can be stored in a system or some type of memory such as a main memory. The software instructions can also be stored in a specific type of memory such as a cache memory that allows faster access. For example, the cache memory ("cache") can be a cache memory local to the processor, a shared local cache among processors in a processor block, a shared cache among multiple processor blocks, or a main memory of the processor-based system. As processor-based systems increase in complexity and performance, the memory capacity requirements of memory may also increase. However, providing additional memory capacity in a processor-based system increases cost and area needed for memory on an integrated circuit.

As an alternative, data compression is a promising approach for meeting the increasing memory capacity demands expected in future systems. Unfortunately, existing compression algorithms do not translate well when directly applied to main memory because they require the memory controller to perform non-trivial computations to locate a cache line within a compressed memory page, thereby increasing access latency and degrading system performance. As a result, for example, accessing a particular cache line in memory may require access to metadata in the memory and an additional layer of address computation to determine the location of the compressed cache line in memory corresponding to the particular cache line. This can increase complexity, cost, and latency to a processor-based system employing memory capacity compression.

Accordingly, there is a need for systems, apparatus, and methods that overcome the deficiencies of conventional approaches including the methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a memory device includes: a memory access device configured to: determine a priority of data among higher priority data and lower priority data; store a first higher priority data in a compressed format at a first location of a first cache line, the first location being a cache line memory address where an uncompressed format of the higher priority data would be stored; determine a first pointer, the first pointer identifying a start location of an unused space of the first cache line; and store a first lower priority data in the compressed format at a second location, wherein the second location begins at the start location.

In another aspect, a memory device implementing a processing device for enabling storage and retrieval of compressed data comprises: a first memory region configured to store a first higher priority compressed data, the first memory region being a first size; a second memory region configured to store a first lower priority compressed data, the second memory region being a second size; and a memory access device configured to: receive a read request; determine one of a higher priority or a lower priority of the read request; retrieve a first cache line comprised of the first memory region based on a determination of the higher priority; and retrieve the first lower priority compressed data from the second memory region based on a determination of the lower priority.

In still another aspect, a method for retrieving compressed data comprising: receiving a read request for compressed data, the read request having a logical memory address; determining a priority of the compressed data based on the read request; upon determining the priority of the compressed data is a higher priority, retrieving the compressed data from a first memory region of a first cache line indicated by the logical memory address; upon determining the priority of the compressed data is a lower priority: retrieving a pointer indicating a physical memory address based on the logical memory address; retrieving the compressed data from a second memory region of the first cache line based on the physical memory address; and decompressing the compressed data.

In still another aspect, a method for storing and retrieving data, the method comprising: storing a first portion of a higher priority compressed data in a first memory region of a first cache line; storing a second portion of the higher priority compressed data in a second memory region of the first cache line; storing a first portion of a lower priority compressed data in a third memory region of the first cache line between the first memory region and the second memory region; and storing a second portion of the lower priority compressed data in a fourth memory region of a second cache line contiguous with the first cache line.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
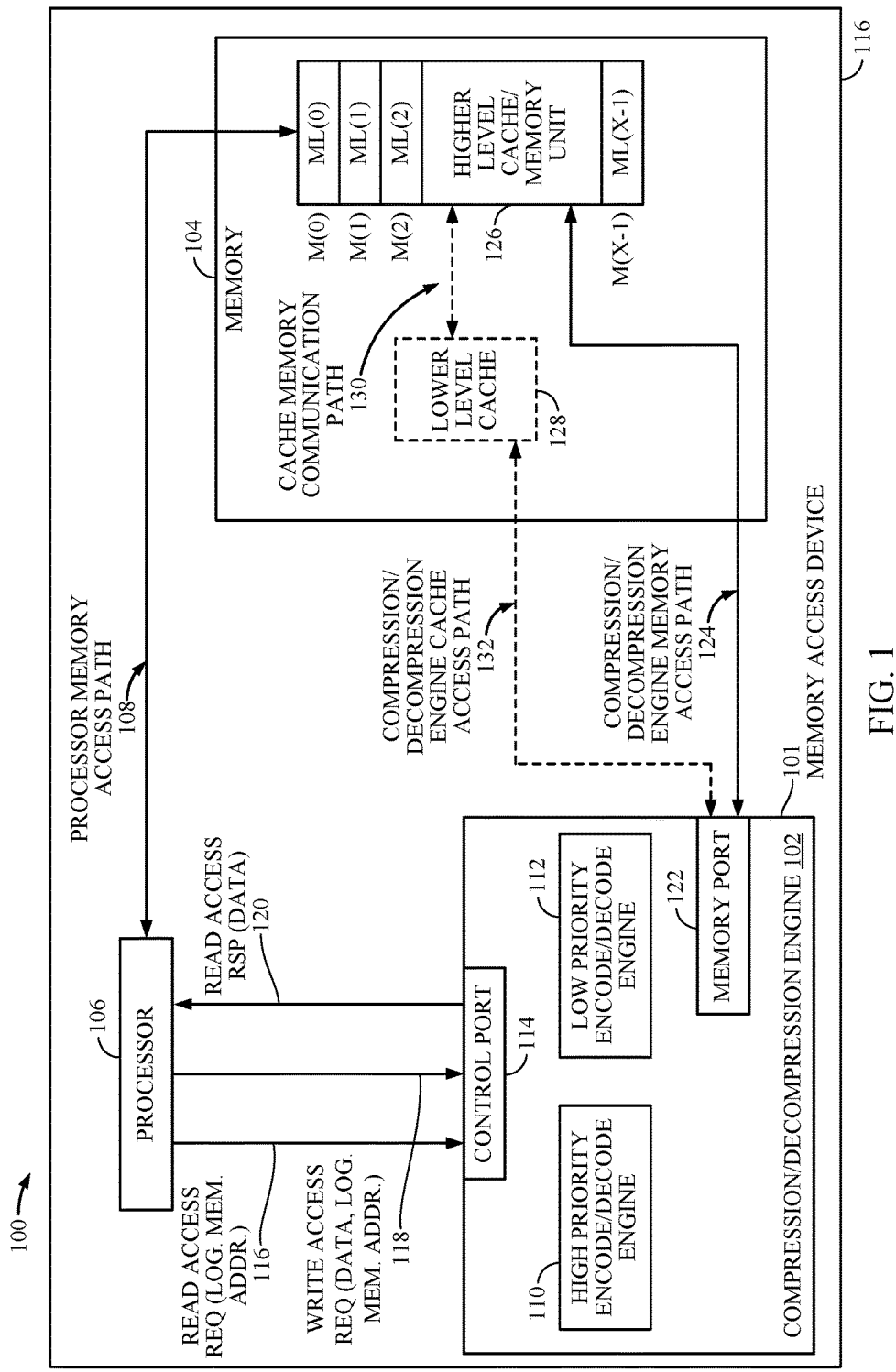
FIG. 1 is a block diagram of an exemplary processor-based system that includes a memory access device configured to optimize exception area reads in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein address the industry needs, as well as other previously unidentified needs, and mitigate shortcomings of the conventional methods, apparatus, and systems. For example, an efficient packing and streaming mechanism for data compression divides compressed data into high and low priority (non-frequent and latency tolerant lines defined as low priority) and pack the high and low priority lines together in memory. The high priority lines are placed (compressed) in the same physical address they would be placed without compression, hence they can be found without pointers/metadata while the low priority lines are placed in holes left by high priority data. The decompression is done incrementally as the data is being received, hiding the latency otherwise added by the decompression.

In this regard, FIG. 1 is a block diagram of an exemplary processor-based system 100. Before discussing the exemplary aspects of priority-based access of compressed memory lines in the processor-based system 100, a description of exemplary components of the processor-based system 100 is first described below.

The processor-based system 100 may include a memory access device 101 configured to provide priority-based access of compressed memory lines in a memory 104 for reducing read access latency for higher priority read access requests. The memory access device 101 may include a decompression engine 102 for reducing read access latency for read access requests in the processor-based system 100. The compression/decompression engine 102 is configured to provide priority-based access of compressed memory lines stored in memory lines ML(0)-ML(X−1) of memory locations M(0)-M(X−1) in a memory 104 for reducing read access latency for higher priority read access requests, where 'X' represents any number of memory locations provided in memory 104 (e.g. DRAM). The processor-based system 100 further includes a processor 106. The processor 106 is configured to execute program instructions stored in memory 104 or otherwise utilize data stored in memory 104 to perform processor-based functionality. The processor 106 can also operate as a memory access device 101 and perform memory accesses to program instructions or data directly to memory 104 through a processor memory access path 108 (e.g., a bus). The processor 106 can also write data directly into memory 104 through the processor memory access path 108. The processor 106 can also perform memory accesses through the compression/decompression engine 102. For example, the processor 106 may be configured to store compressed data directly into memory 104. The compression/decompression engine 102 is configured to control memory read accesses to memory 104, including decompressing data retrieved from memory 104 if compressed. The compression/decompression engine 102 is configured to provide accessed data from memory lines ML(0)-ML(X−1) to the processor 106.

With continuing reference to FIG. 1, the compression/decompression engine 102 includes a high priority encode/decode engine 110 configured to read in higher priority data from memory 104. The compression/decompression engine 102 also includes a low priority encode/decode engine 112 configured to read in lower priority memory lines from memory 104. Low priority data may be read only, non-frequently accessed, or latency tolerant data. High priority data may be read only, frequently accessed, or latency sensitive data. The compression/decompression engine 102 further includes a control port 114 configured to facilitate an exchange of communications between the compression/decompression engine 102 and the processor 106. Communication examples include a read request 116 from the processor 106 that includes a logical memory address to request corresponding data. Communication examples further include a write access request 118 that includes data to be written into memory 104 and a corresponding logical memory address. Communication examples further include a read access response 120 to the processor 106 that includes the requested data. The compression/decompression engine 102 further includes a memory port 122 configured to facilitate an exchange of communications between the compression/decompression engine 102 and memory 104 through a compression/decompression engine memory access path 124.

In the exemplary processor-based system 100, memory 104 includes a memory unit 126 that stores compressed memory lines. Memory unit 126 includes X physical memory locations M(0)-M(X−1), each physical memory location M configured to store a memory line ML of a predetermined size of data, for example, one hundred twenty eight (128) bytes. The compressed memory lines may be stored in memory unit 126 by the processor 106 through the processor memory access path 108, or by the compression/decompression engine 102 through the compression/decompression engine memory access path 124. In an exemplary aspect, and as will be discussed in more detail with reference to FIG. 2, each physical memory location M stores in each memory line ML a first portion of a first compressed memory line, a portion of a second compressed memory line, and a second portion of the first compressed memory line. The portion of the second compressed memory line is stored in "holes" (e.g. the exception area) left in the corresponding memory line ML(0)-ML(X−1) by the compression of the first memory line. This allows memory unit 126 to store more than X compressed memory lines in the X memory lines ML(0)-ML(X−1) of the X physical memory locations M(0)-M(X−1) of memory unit 126.

In one exemplary aspect, memory 104 may operate as a multi-level cache memory. In this regard, memory unit 126 may operate as a higher level cache memory that stores compressed memory lines, and memory 104 may further include an optional lower level cache 128 that stores uncompressed memory lines previously accessed from memory unit 126 for faster read access. The optional lower level cache 128 may exchange communications with memory unit 126 through a cache memory communication path 130 and with the compression/decompression engine 102 through a compression/decompression engine cache access path 132. In this regard, if the logical memory address of the read request 116 results in a cache hit at the optional lower level cache 128, the compression/decompression engine 102 accesses the requested data at the optional lower level cache 128 and provides the requested data to the processor 106 in a read access response 120. However, if the logical memory address of the read request 116 results in a cache miss at the optional lower level cache 128, the compression/decompression engine 102 accesses the requested data by accessing a corresponding compressed memory line ML(0)-ML(X−1) at memory unit 126, decompressing the compressed memory line ML(0)-ML(X−1), and providing the requested data to the processor 106 in the read access response 120.

To provide for priority-based access of compressed memory lines ML(0)-ML(X−1) in memory 104 in the processor-based system 100, in one exemplary aspect, the compression/decompression engine 102 receives a read request 116 to access data from memory 104. The requested data is of up to a predetermined size, and each of the addressable physical memory locations M(0)-M(X−1) in memory 104 is configured to store a corresponding memory line ML(0)-ML(X−1) of the predetermined size. As noted earlier, each memory line ML(0)-ML(X−1) includes a first portion of a first compressed memory line, a portion of a second compressed memory line, and a second portion of the first compressed memory line.

Each memory line ML(0)-ML(X−1) is configured to include a compressed higher priority memory line as a first portion of a first compressed memory line and a second portion of the first compressed memory line, and a portion of a compressed lower priority memory line as the portion of the second compressed memory line. This allows memory 104 to store up to X compressed higher priority memory lines, each within a memory line ML(0)-ML(X−1) of a corresponding physical memory location M(0)-M(X−1), and therefore, to store each of the up to X compressed higher priority memory lines in a physical memory location M(0)-M(X−1) of memory 104 corresponding to a logical memory address of the corresponding higher priority data. Further, this allows memory 104 to store additional compressed memory lines, i.e., compressed lower priority memory lines, within the X physical memory locations M(0)-M(X−1) of memory 104, thus increasing capacity of memory 104 without increasing the size of memory 104. Accordingly, in the exemplary aspect, the compression/decompression engine 102 can access data in memory 104 with reduced latency, while increasing the capacity of memory 104.

In that regard, in this example, upon receiving a read request 116, the compression/decompression engine 102 determines a priority of the read access request. If the read request 116 is a higher priority read access request, the compression/decompression engine 102 uses a logical memory address of the read request 116 as the physical memory address to access a physical memory location M(0)-M(X−1) that contains the requested higher priority data. The physical memory location M(0)-M(X−1) in memory 104 contains a memory line ML(0)-ML(X−1) that includes a compressed higher priority memory line corresponding to the read request 116 in compressed form. In this manner, latency associated with translation of the logical memory address of the higher priority read access request to the corresponding physical memory address M(0)-M(X−1) in memory 104 is not required to access the required higher priority data from memory 104. The compression/decompression engine 102 can decompress the compressed higher priority data and provide the requested higher priority data via a read access response 120.

On the other hand, if the read request 116 is a lower priority read access request, the compression/decompression engine 102 may use a pointer to translate the logical memory address of the read request 116 into a physical memory address to access contiguous memory locations M(0)-M(X−1) that store the requested lower priority data. Each of the contiguous physical memory locations M(0)-M(X−1) contains a hole left by the compression of corresponding higher priority data, and the holes combine to store a corresponding memory line ML(0)-ML(X−1) that includes the requested lower priority data in compressed form. Thus, the compression/decompression engine 102 can decompress the compressed lower priority data and provide the requested lower priority data via a read access response 120. In this manner, although a pointer is used in the translation of the logical memory address for the read request 116, such translation is limited to a start location for lower priority read access requests, thus providing a higher overall memory access efficiency of compressed memory lines in the processor-based system 100. Further, compressed lower priority memory lines are stored in holes of contiguous memory lines left by the compression of the higher priority data, thus only the start location is needed along with the number of contiguous memory lines instead of needing a pointer for each memory line that stores a portion of the lower priority data.

Figure 2A:
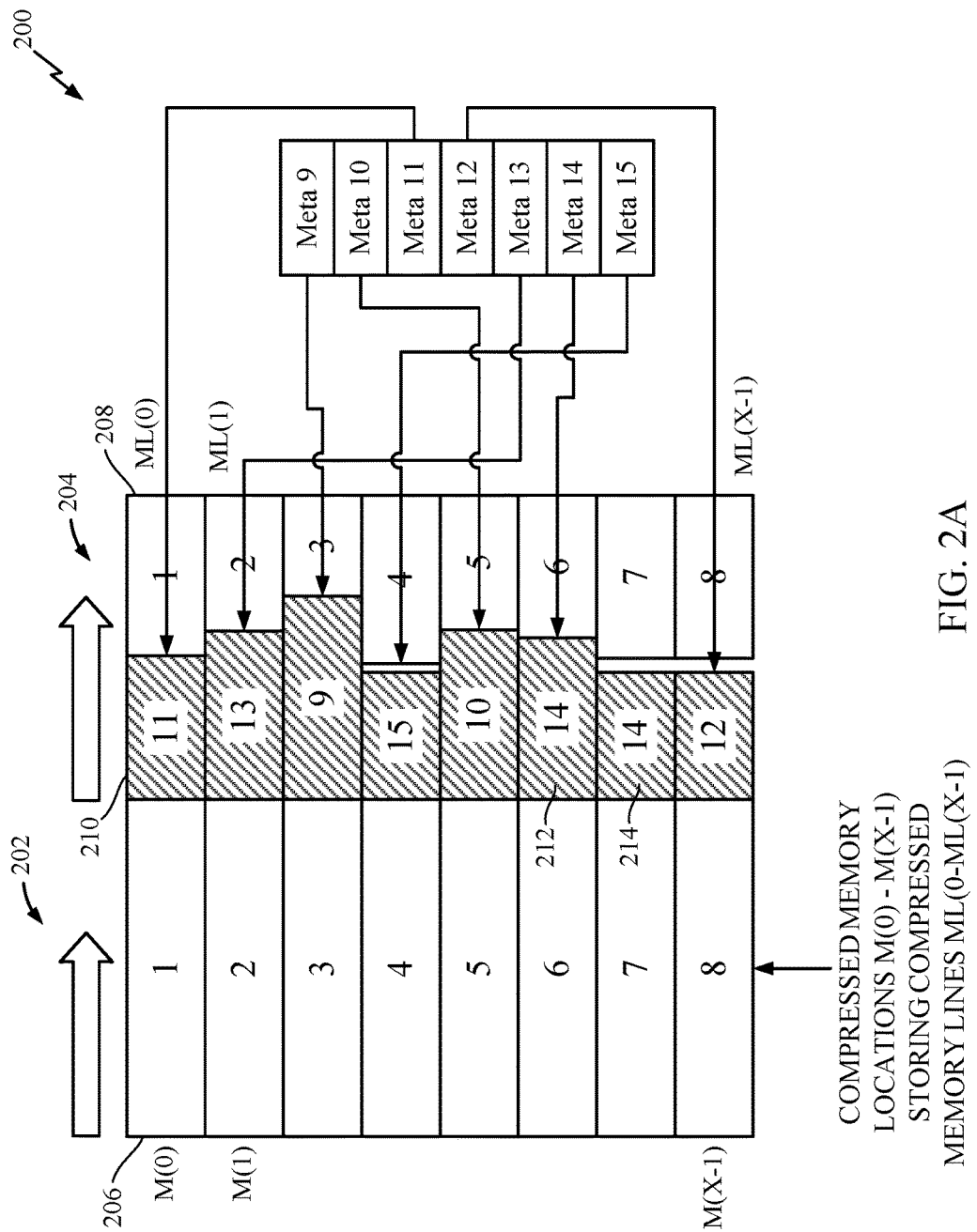
FIGS. 2A-C are diagrams illustrating exemplary memory configurations of stored compressed memory lines for higher priority data and lower priority data in accordance with some examples of the disclosure.
Figure 2B:
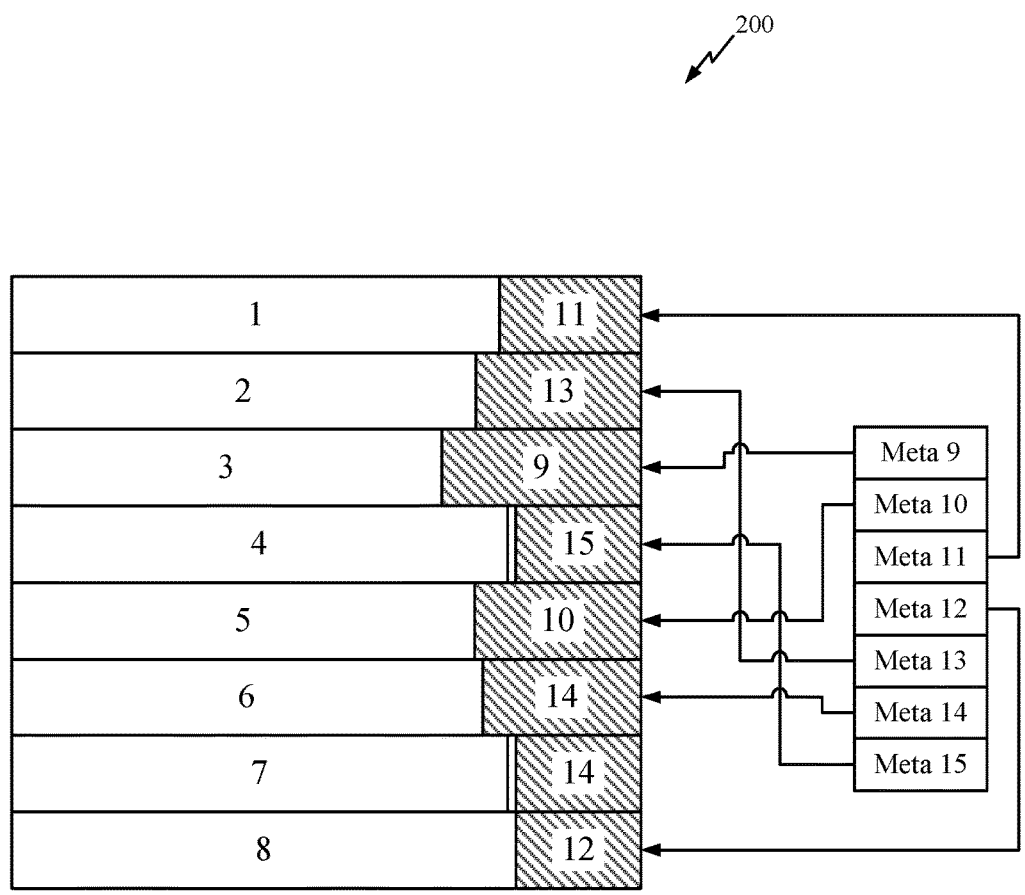
Figure 2C:
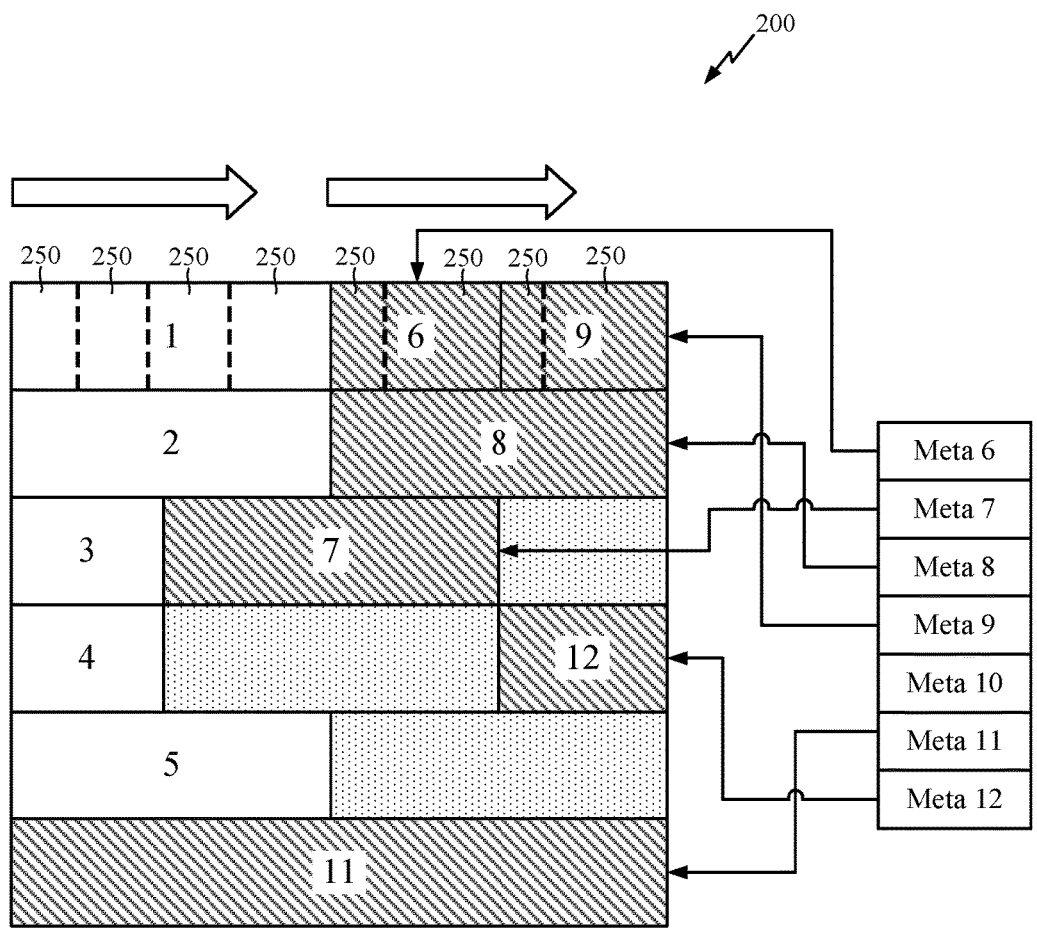

In this regard, FIGS. 2A-C are diagrams illustrating exemplary memory configurations 200 of stored compressed memory lines for higher priority data and lower priority data in memory 104 in the processor-based system 100 illustrated in FIG. 1. As noted with respect to memory 104 in FIG. 1, and in particular with respect to memory unit 126 within memory 104, memory 104 includes X physical memory locations M(0)-M(X−1), each physical memory location M(0)-M(X−1) configured to store a memory line ML(0)-ML(X−1) of a predetermined size, for example, 128 bytes. As shown in FIG. 2A, the memory configuration 200 is divided into two halves, a first memory region 202 and a second memory region 204. For example, if a memory line is 128 bytes, the first memory region 202 of that memory line may be 64 bytes while the second memory region 204 of that memory line may be 64 bytes but it should be understood that the first memory region 202 may be larger or smaller than the second memory region 204. In the example of FIG. 2A, memory configuration 200 includes eight higher priority data 1-8 and seven lower priority data 9-15 segments. The memory configuration 200 stores (e.g. by utilizing the compression/decompression engine 102) each of the eight higher priority data lines 1-8 beginning at the start of a memory line until the first memory region 202 is full for that memory line (e.g. a first portion of a first compressed memory line), then the remainder is stored such that the last data of the high priority data is at the end of the second memory region 204 (e.g. a second portion of the first compressed memory line). This creates a "hole" or space at the start of the second memory region 204 until the start of the remainder of the higher priority data. After the eight higher priority data are stored, then the lower priority data may be stored in the "holes". The lower priority data 9-15 is stored beginning at boundary between the first memory region 202 and the second memory region 204 (e.g. a first portion of the second compressed memory line) in a manner that avoids or mitigates fragmentation. Once a particular memory line is filled, the lower priority data, such as lower priority data 14, is then continued on the next contiguous memory line beginning at the boundary between the first memory region 202 and the second memory region 204 (e.g. a second portion of the second compressed memory line) until storage is complete or the memory line is full and so on until the storage is complete. The memory configuration 200 attempts to arrange the lower priority data 9-15 using the least amount of contiguous memory lines as possible. In the example of FIG. 2A, only the lower priority data 14 requires storage in a first memory location and a second memory location.

As shown in FIG. 2A, for example, each physical memory location M(0)-M(X−1) is capable of storing a memory line ML(0)-ML(X−1) that includes a first portion of a compressed higher priority memory line 206 and a second portion of the compressed higher priority memory line 208 (higher priority data 1 as shown in FIG. 2A). Further, each of the physical memory locations M(0)-M(X−1) is capable of storing a portion of a compressed lower priority memory line. In this example, a first portion of compressed lower priority memory line 210 is stored on the same memory line (shown as ML(0) in FIG. 2A) in a hole left in the physical memory location M(0) by compression of the higher priority data 1 and between the first portion of the compressed higher priority memory line 206 and the second portion of the compressed higher priority memory line 208.

Thus, high priority memory lines are placed (compressed) in the same physical address they would be placed without compression, hence they can be found without pointers/metadata. Low priority memory lines are placed in the holes left by high priority lines but start at an efficient read point split, effectively separating the high priority lines into two parts. Meta 9-15 (e.g. a pointer) are used to efficiently place low priority lines in the holes. A pointer is used to indicate the start location of the first portion of the compressed lower priority memory line 210. Since the lower priority data starts at the boundary between the first memory region 202 and the second memory region 204, the Meta 14, for example, may only need to indicate the physical memory location M(6) and, possibly, the number of contiguous memory locations to retrieve during retrieval of the lower priority data 14.

As shown in FIG. 2B, an alternative memory configuration 200 may store the higher priority data 1-8 contiguously on the same memory line starting from a beginning of the memory line (left side of memory configuration 200) until the higher priority data storage is complete. This may avoid dividing each of the higher priority data 1-8 into two halves such as shown in FIG. 2A. In the example of FIG. 2B, memory configuration 200 includes eight higher priority data 1-8 and seven lower priority data 9-15 segments. The memory configuration 200 stores (e.g. by utilizing the compression/decompression engine 102) each of the eight higher priority data lines 1-8 beginning at the start of a memory line until the storage is complete (or the memory line is full). Then the seven lower priority data 9-15 are stored in the "holes" beginning at the end of the memory line (right side of the memory configuration) until the end of the higher priority data 1-8 on that memory line. Once a particularly memory line is filled, the lower priority data, such as lower priority data 14, is then continued on the next contiguous memory line beginning at the end of the next memory line.

As shown in FIG. 2C, an alternative memory configuration 200 may be divided into bins 250 of 16 bytes each for each memory line (128 bytes in this example). The memory configuration may store the higher priority data 1-5 in contiguous bins 250 on the same memory line starting from a beginning of the memory line (left side of memory configuration 200) until the higher priority data storage is complete. In the example of FIG. 2C, memory configuration 200 includes five higher priority data 1-5 and six lower priority data 6-9, 11, and 12 segments. The memory configuration 200 stores (e.g. by utilizing the compression/decompression engine 102) each of the five higher priority data lines 1-5 beginning at the bin 250 at the start of a memory line until the storage is complete (or the memory line is full). Then the six lower priority data 6-9, 11, and 12 are stored in the empty bins without having to start at the end of the memory line (right side of the memory configuration) or at a boundary between a first and second memory region. For example, lower priority data 7 begins at the first empty bin 250 after the higher priority data 3 while lower priority data 12 starts in the last empty bin 250 (from right side of the memory configuration going left).

Using pointers (Meta 9-15 of FIG. 2A for example) adds complexity to the system and latencies related to fetch the pointer from a memory location (e.g. may be any of the memory locations disclosed herein or a separate memory location not shown). However, adding the pointers allows for guaranteed contiguous memory locations for the low priority lines and also allows for perfect placement of each particular low priority line in the best spaces left by high priority lines to avoid fragmentation. Once the pointer is acquired, the memory reads are contiguous and can be pipelined to further reduce latency. If pointers are located in non-cache memory (e.g. if the collective size is large), an existing or new cache can be used to avoid fetching the pointers from slow memory every time. Hence, pointer usage is confined to low priority and packing is virtually perfect.

In contrast, memory 104 stores up to X compressed higher priority memory lines M(0)-M(X−1). Each compressed higher priority memory line is placed in a corresponding memory line ML(0)-ML(X−1) and stored in a corresponding physical memory location M(0)-M(X−1) that matches the logical memory address of the corresponding uncompressed higher priority memory line, i.e., the corresponding higher priority data. This configuration characteristic allows each compressed higher priority memory line to be accessed by reading only one memory line ML(0)-ML(X−1) from a corresponding physical memory location M(0)-M(X−1) in memory 104. However, to take advantage of this configuration characteristic, the compression/decompression engine 102 needs to determine that a read request 116 is a higher priority access request.

In this regard, the compression/decompression engine 102 may be configured to determine that a read request 116 is a higher priority read access request by determining that the logical memory address of the read request 116 is within a higher priority address range that extends from 0 to X−1. For the examples shown in FIGS. 2A-B, as noted above, memory 104 includes 8 (e.g. X equals 8) physical memory locations M(0)-M(7). In one exemplary aspect, each of physical memory locations M(0)-M(7) includes one compressed higher priority memory line that can be accessed using the logical memory location of the read request 116 as a physical memory location M(0)-M(7). Thus, in the exemplary memory configuration 200, the compressed higher priority data 1-8 are stored in the 8 physical memory locations M(0)-M(7). Accordingly, in one exemplary aspect, the higher priority address range is from 0 to 7, and the compression/decompression engine 102 can determine that a read request 116 is a higher priority read access request by determining that the logical memory address of the read request 116 falls between 0 and 7.

In this example, using the logical memory address of the read request 116 to indicate the priority of the read request 116 obviates the need to access metadata (e.g. Meta 9-15) in memory 104 or other memory to determine that the received read request 116 is a higher priority access request. Furthermore, because each logical memory address corresponds to one of a compressed higher priority data (1-8) or a compressed lower priority data (9-15), the compression/decompression engine 102 is further configured to determine that a read request 116 is a lower priority read access request by determining that the logical memory address of the read request 116 falls outside the higher priority address range. For a lower priority read access request however, the compression/decompression engine 102 needs to determine the physical memory locations M(0)-M(7) including the requested lower priority data, i.e., the corresponding compressed lower priority memory line, using a translation of the logical memory address of the read request 116.

In this regard, in one aspect, each compressed lower priority data is stored in the memory configuration 200 such that a corresponding physical memory locations M(0)-M(X−1) may be derived from the starting logical memory address of the lower priority read access request. In particular, it is noted that in the example of FIG. 2A, the lower priority data 14 is stored in memory 104 such that the first portion 212 of the compressed lower priority data 14 is stored in physical memory location M(5) and the second portion 214 of the compressed lower priority data 14 is in the next contiguous memory location M(6). Accordingly, the configuration characteristic of the memory configuration 200 allows determination of the first physical memory location M(q) of a plurality of physical memory locations M(0)-M(X−1) that store a corresponding compressed lower priority data based on the value X (i.e. the boundary is start location for X) and, if necessary, the number of contiguous locations. Thus, this exemplary aspect may use only one pointer for the translation of the logical memory address to start and the corresponding number of contiguous physical memory locations. Accordingly, the configuration characteristics of the memory configuration 200 allow the compression/decompression engine 102 to determine the physical memory location M(0)-M(X−1) of each compressed lower priority data start based on a pointer and, if necessary, the number of contiguous physical memory locations in memory 104. However, because each physical memory location M(0)-M(X−1) stores a memory line ML(0)-ML(X−1) including a compressed higher priority data and at least a portion of a compressed lower priority data, each compressed lower priority data is stored between consecutive portions of compressed higher priority data, each portion of each compressed lower priority data being stored at an edge (e.g. second memory region 204) of a corresponding physical memory location M(0)-M(X−1) to occupy up to half of the corresponding physical memory location M(0)-M(X−1). This facilitates retrieval of each compressed data by a single memory access to memory 104.

Figure 3:
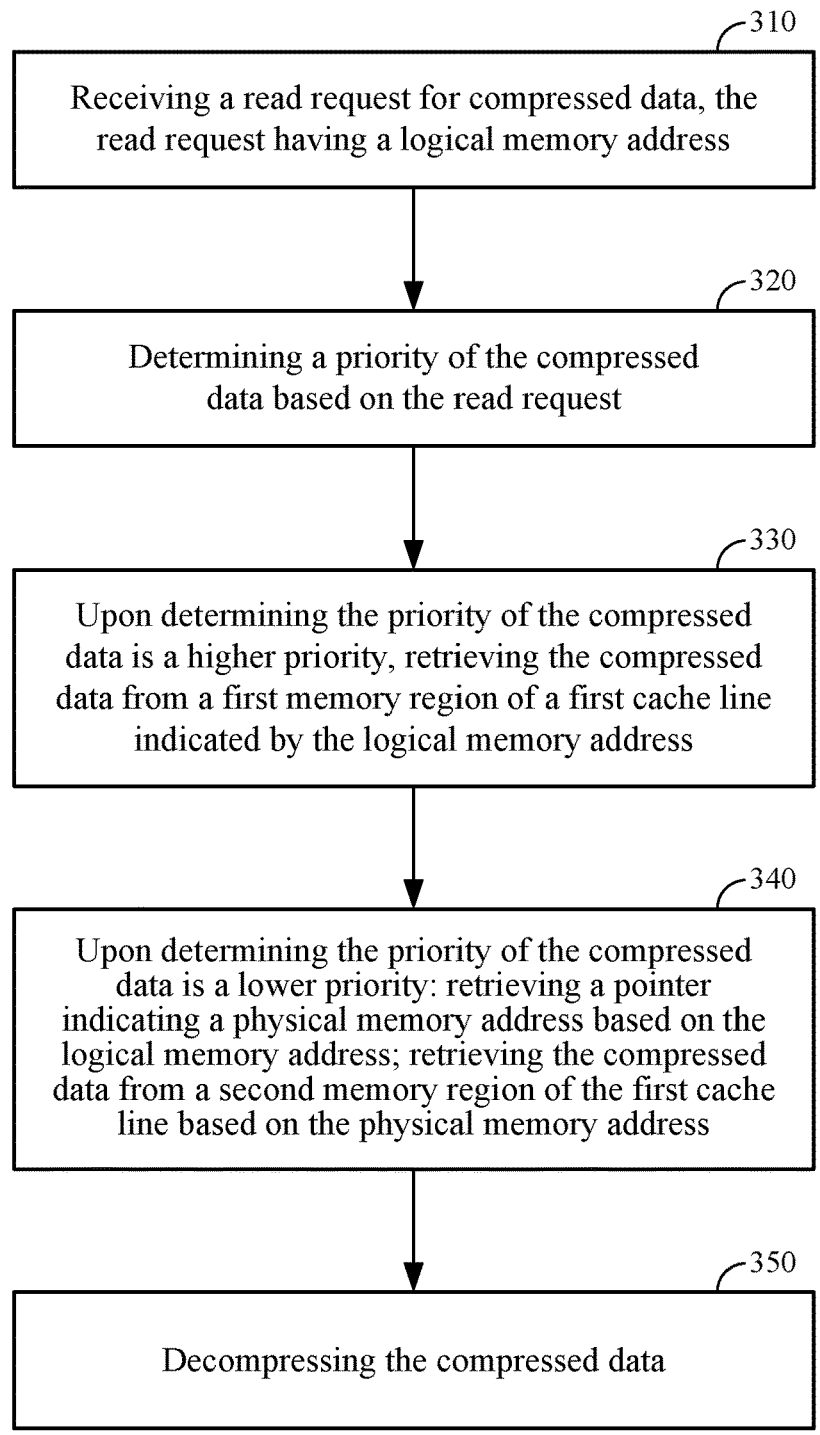
FIG. 3 is an exemplary method of retrieving compressed data in accordance with some examples of the disclosure.

FIG. 3 is a flowchart illustrating an exemplary partial process 300 of the compression/decompression engine 102 performing a priority-based read request 116 to compressed memory lines in memory 104 in the processor-based system 100 in FIG. 1 for reducing read access latency. As discussed above, in the example of the processor-based system 100, the compression/decompression engine 102 is called upon to perform the memory read request 116 if a miss occurs to the optional lower level cache 128. In the exemplary partial process 300, the method for retrieving compressed data begins with receiving a read request 116 for compressed data, the read request 116 including a logical memory address (block 310). Then, determine a priority of the compressed data based on the read request 116 (block 320). Upon determining the priority of the compressed data is a higher priority, retrieving a first portion of the compressed data from a first memory region of a first cache line indicated by the logical memory address (block 330). Upon determining the priority of the compressed data is a lower priority: retrieving a pointer indicating a physical memory address based on the logical memory address; retrieving the compressed data from a second memory region of the first cache line based on the physical memory address (block 340). The partial process 300 concludes with decompressing the compressed data (block 350).

Accordingly, the exemplary process 300 for read access of compressed memory lines in memory 104 does not require a translation of a logical memory address of the high priority compressed data read to the corresponding physical memory address. This may obviate the need to employ and access metadata in memory 104 or other memory and/or employ indexing to perform a translation, and the associated latency. Therefore, by storing the most frequently used data in higher priority memory lines, for example, these exemplary aspects result in a higher overall memory access efficiency in the processor-based system 100 than in systems where translation of the logical memory address of the requested data is required for access regardless of their priority.

Figure 4:
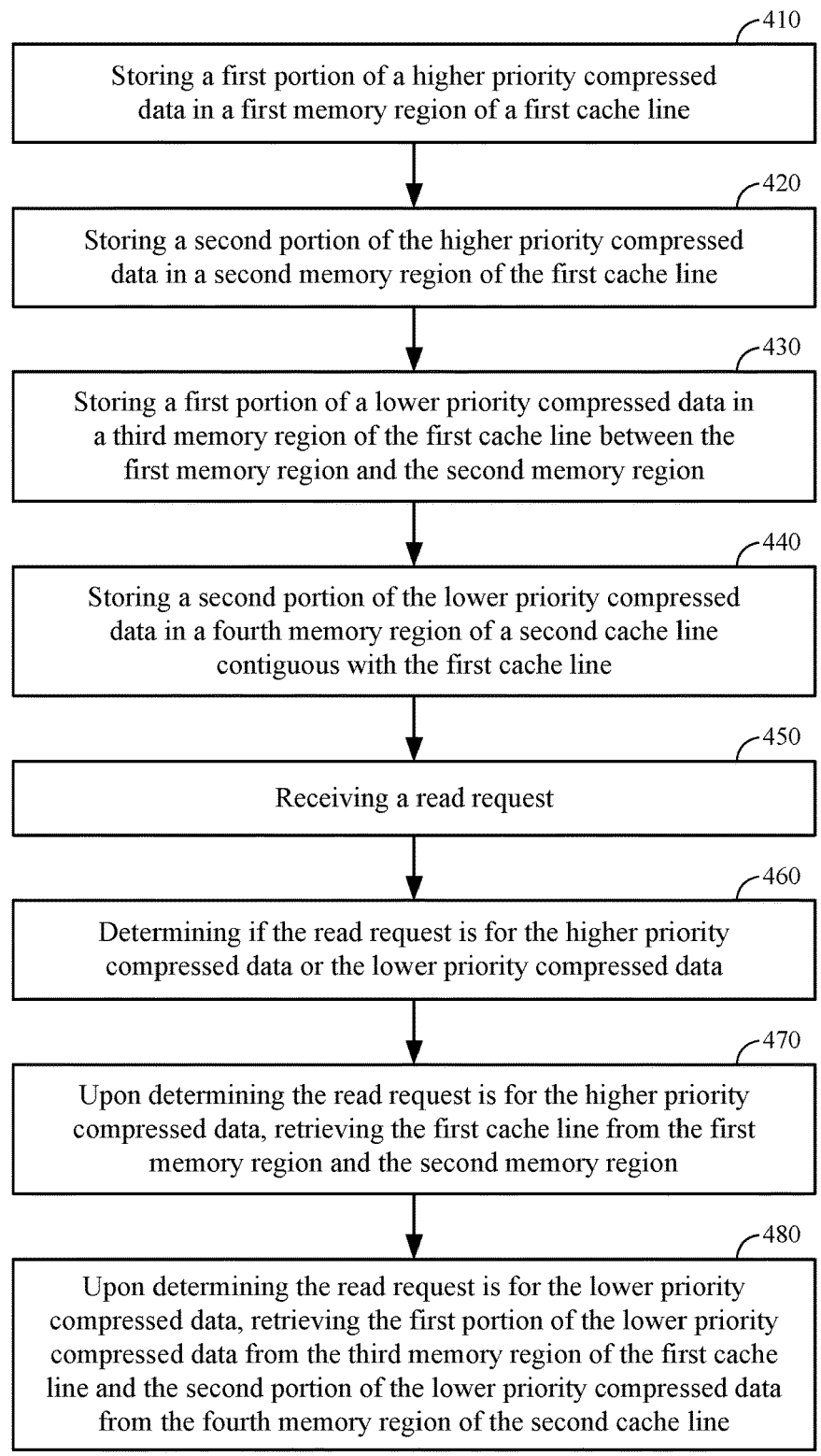
FIG. 4 is an exemplary method of storing and retrieving compressed data in accordance with some examples of the disclosure.

Referring now to FIG. 4, FIG. 4 is a flowchart illustrating an exemplary partial process 400 of the processor-based system 100 in FIG. 1 for reducing read access latency. As discussed above, in the example of the processor-based system 100, the memory access device 101, the compression/decompression engine 102, the processor 106, or any combination may be used for storing and retrieving data. The partial process 400 begins with storing a first portion of a higher priority compressed data in a first memory region of a first cache line (block 410), followed by storing a second portion of the higher priority compressed data in a second memory region of the first cache line (block 420). The process continues with storing a first portion of a lower priority compressed data in the third memory region of the first cache line between the first memory region and the second memory region (block 430). The process continues with storing a second portion of the lower priority compressed data in a fourth memory region of a second cache line contiguous with the first cache line (block 440). Next, a read request is received (block 450). The process continues with determining if the read request is for the higher priority compressed data or the lower priority compressed data (block 460). Upon determining the read request if for the higher priority compressed data, the first cache line is retrieved from the first memory region and the second memory region (block 470). Upon determining the read request is for the lower priority compressed data, the first portion of the lower priority compressed data is retrieved from the third memory region of the first cache line and the fourth portion of the lower priority compressed data is retrieved from the fourth memory region of the second cache line (block 480).

Figure 5:
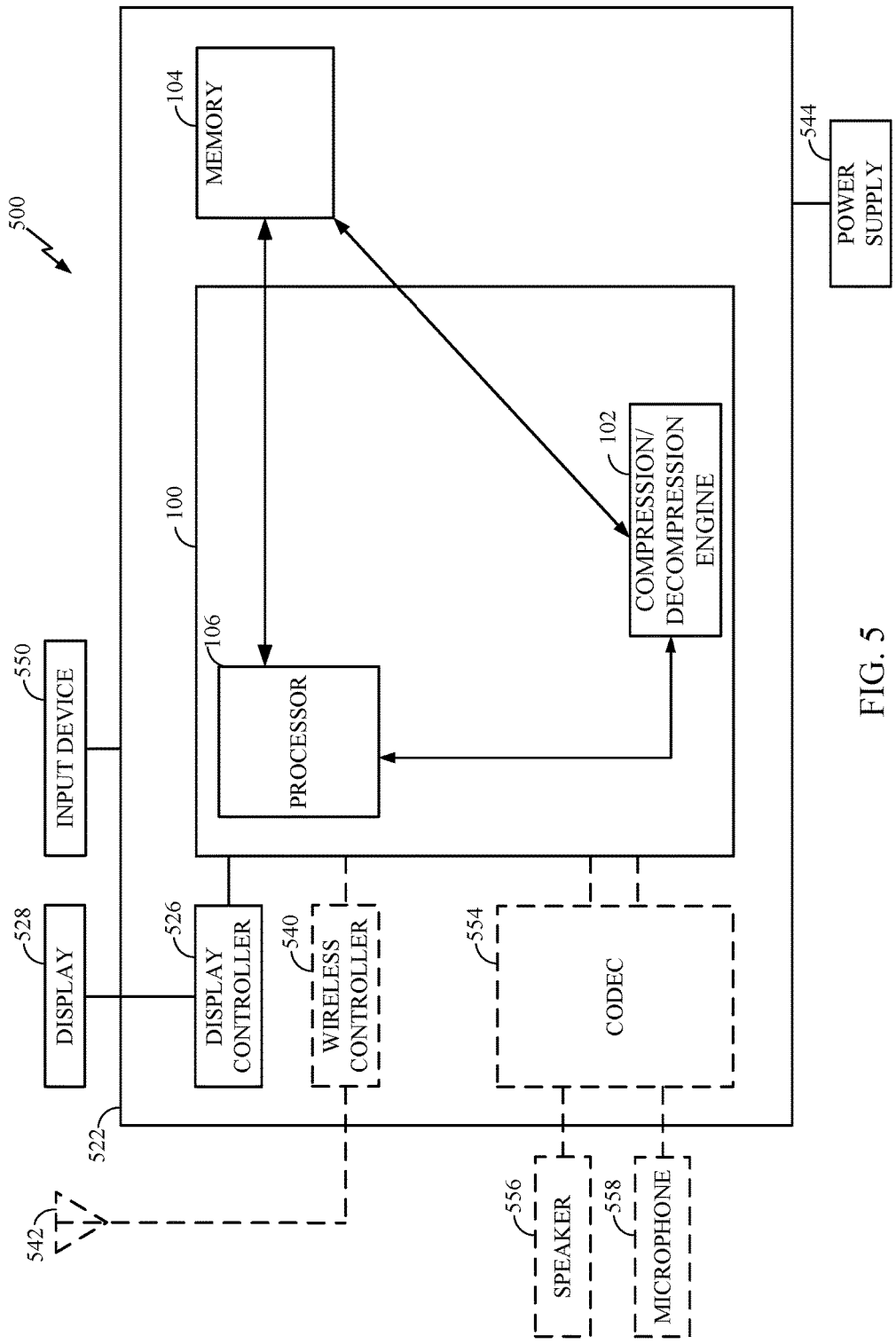
FIG. 5 illustrates an exemplary computing device, in which an aspect of the disclosure may be advantageously employed.

Referring now to FIG. 5, a block diagram of a computing device that is configured according to exemplary aspects is depicted and generally designated 500. In some aspects, computing device 500 may be configured as a wireless communication device or a server. As shown, computing device 500 includes processor-based system 100 of FIG. 1, which may be configured to implement processes 300 and/or 400 of FIGS. 3 and 4 in some aspects. Processor-based system 100 is shown in FIG. 5 with compression/decompression engine 102, memory 104, and processor 106 while other details of the processor-based system 100 that were previously described with reference to FIG. 1 have been omitted from this view for the sake of clarity.

Processor-based system 100 may be communicatively coupled to memory 104. Computing device 500 also includes a display 528 and a display controller 526, with the display controller 526 coupled to processor-based system 100 and to the display 528. It should be understood that the display 528 and the display controller 526 are optional.

In some aspects, FIG. 5 may include some optional blocks showed with dashed lines. For example, computing device 500 may optionally include coder/decoder (CODEC) 554 (e.g., an audio and/or voice CODEC) coupled to processor-based system 100; speaker 556 and microphone 558 coupled to CODEC 554; and wireless controller 540 (which may include a modem) coupled to wireless antenna 542 and to processor-based system 100.

In a particular aspect, where one or more of the above-mentioned optional blocks are present, processor-based system 100, display controller 526, CODEC 554, and wireless controller 540 can be included in a system-in-package or system-on-chip device 522. Input device 550, power supply 544, display 528, speaker 556, microphone 558, and wireless antenna 542 may be external to system-on-chip device 522 and may be coupled to a component of system-on-chip device 522, such as an interface or a controller.

It should be noted that although FIG. 5 depicts a computing device, processor-based system 100 and memory 104 may also be integrated into a set top box, a music player, a video player, an entertainment unit, a navigation device, a personal digital assistant (PDA), a fixed location data unit, a computer, a laptop, a tablet, a communications device, a mobile phone, server, or other similar devices.

The word "exemplary" is used herein to mean "serving as an example, instance, or illustration." Any details described herein as "exemplary" is not to be construed as advantageous over other examples. Likewise, the term "examples" does not mean that all examples include the discussed feature, advantage or mode of operation. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, actions, operations, elements, and/or components, but do not preclude the presence or addition of one or more other features, integers, actions, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated in this application is intended to dedicate any component, action, feature, benefit, advantage, or equivalent to the public, regardless of whether the component, action, feature, benefit, advantage, or the equivalent is recited in the claims.

Further, those of skill in the art will appreciate that the various illustrative logical blocks, modules, circuits, and algorithm actions described in connection with the examples disclosed herein may be implemented as electronic hardware, computer software, or combinations of both. To clearly illustrate this interchangeability of hardware and software, various illustrative components, blocks, modules, circuits, and actions have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Although some aspects have been described in connection with a device, it goes without saying that these aspects also constitute a description of the corresponding method, and so a block or a component of a device should also be understood as a corresponding method action or as a feature of a method action. Analogously thereto, aspects described in connection with or as a method action also constitute a description of a corresponding block or detail or feature of a corresponding device. Some or all of the method actions can be performed by a hardware apparatus (or using a hardware apparatus), such as, for example, a microprocessor, a programmable computer or an electronic circuit. In some examples, some or a plurality of the most important method actions can be performed by such an apparatus.

It should furthermore be noted that methods disclosed in the description or in the claims can be implemented by a device comprising means for performing the respective actions of this method.

Furthermore, in some examples, an individual action can be subdivided into a plurality of sub-actions or contain a plurality of sub-actions. Such sub-actions can be contained in the disclosure of the individual action and be part of the disclosure of the individual action.

While the foregoing disclosure shows illustrative examples of the disclosure, it should be noted that various changes and modifications could be made herein without departing from the scope of the disclosure as defined by the appended claims. The functions and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A memory device, comprising:
   a memory access device configured to:
      determine a priority of data among higher priority data and lower priority data;
      store a first higher priority data in a compressed format at a first location of a first cache line of a cache memory, the first location is a cache line memory address configured to store uncompressed format of the higher priority data such that a logical memory address of the cache line memory address is used as a physical memory address of the cache line memory address;
      determine a first pointer, the first pointer identifying a start location of an unused space of the first cache line; and
      store a first lower priority data in the compressed format at a second location, wherein the second location begins at the start location.

2. The memory device of claim 1, further comprising a compression/decompression engine configured to decompress the first higher priority data and the first lower priority data in increments before a complete cache line is retrieved.

3. The memory device of claim 1, wherein the memory access device is further configured to retrieve the first lower priority data and retrieve the first higher priority data as a complete cache line.

4. The memory device of claim 3, wherein the memory device is incorporated into a device selected from a group consisting of a set top box, a music player, a video player, an entertainment unit, a navigation device, a personal digital assistant (PDA), a fixed location data unit, a computer, a laptop, a tablet, a communications device, a mobile phone, server, or other similar devices.

5. The memory device of claim 1, wherein the first lower priority data is stored in a plurality of contiguous locations.

6. A memory device implementing a processing device for enabling storage and retrieval of compressed data, the memory device comprising:
   a first memory region, of a cache memory, configured to store a first higher priority compressed data, the first memory region being a first size;
   a second memory region, of the cache memory, configured to store a first lower priority compressed data, the second memory region being a second size; and
   a memory access device configured to:
      receive a read request;
      determine one of a higher priority or a lower priority of the read request;
      retrieve a first cache line comprised of the first memory region based on a determination of the higher priority and a logical memory address of the first cache line, wherein the logical memory address is used as a physical memory address of the first cache line; and
      retrieve the first lower priority compressed data from the second memory region based on a determination of the lower priority.

7. The memory device of claim 6, wherein the memory access device is further configured to:
   store the first higher priority compressed data in the first memory region of the first cache line; and
   store the first lower priority compressed data in the second memory region.

8. The memory device of claim 7, wherein the first size is approximately equal to the second size.

9. The memory device of claim 7, wherein the memory access device is further configured to store a portion of the first lower priority compressed data in a third memory region of a second cache line contiguous with the first cache line.

10. The memory device of claim 7, wherein the first cache line comprises the first memory region and the second memory region.

11. The memory device of claim 10, wherein the memory access device is further configured to store the first higher priority compressed data at a start of the first cache line and to store the first lower priority compressed data at an end of the first cache line.

12. The memory device of claim 6, wherein the read request includes the logical memory address and the memory access device is further configured to retrieve the first memory region based on the logical memory address.

13. The memory device of claim 6, wherein the memory access device is further configured to retrieve the first lower priority compressed data based on a pointer.

14. The memory device of claim 6, wherein the memory access device is a processor.

15. The memory device of claim 6, wherein the memory device is incorporated into a device selected from a group consisting of a set top box, a music player, a video player, an entertainment unit, a navigation device, a personal digital assistant (PDA), a fixed location data unit, a computer, a laptop, a tablet, a communications device, a mobile phone, server, or other similar devices.

16. A method for retrieving compressed data, the method comprising:
   receiving a read request for compressed data, the read request having a logical memory address;
   determining a priority of the compressed data based on the read request;
   upon determining the priority of the compressed data is a higher priority, retrieving the compressed data from a first memory region of a first cache line indicated by the logical memory address such that the logical memory address of the first cache line is used as a physical memory address of the first cache line;

upon determining the priority of the compressed data is a lower priority:
  retrieving a pointer indicating the physical memory address based on the logical memory address;
  retrieving the compressed data from a second memory region of the first cache line based on the physical memory address; and
decompressing the compressed data.

17. The method of claim 16, wherein the priority of the compressed data is determined based on the logical memory address of the read request.

18. The method of claim 16, wherein the first memory region of the first cache line is contiguous with the second memory region of the first cache line.

19. The method of claim 18, further comprising, upon determining the priority of the compressed data is the lower priority, retrieving the compressed data from a third memory region of a second cache line contiguous with the first cache line.

20. The method of claim 19, further comprising, upon determining the priority of the compressed data is the higher priority, retrieving the compressed data from a fourth memory region of the first cache line wherein the second memory region is between the first memory region and the fourth memory region of the first cache line.

21. The method of claim 16, further comprising:
  storing the higher priority compressed data in the first memory region of the first cache line; and
  storing the lower priority compressed data in the second memory region of the first cache line.

22. The method of claim 16, wherein the method is performed by a device selected from a group consisting of a set top box, a music player, a video player, an entertainment unit, a navigation device, a personal digital assistant (PDA), a fixed location data unit, a computer, a laptop, a tablet, a communications device, a mobile phone, server, or other similar devices.

23. A method for storing and retrieving data, the method comprising:
  storing a first portion of a higher priority compressed data in a first memory region of a first cache line of a cache memory such that a logical memory address of the first cache line is used as a physical memory address of the first cache line;
  storing a second portion of the higher priority compressed data in a second memory region of the first cache line;
  storing a first portion of a lower priority compressed data in a third memory region of the first cache line between the first memory region and the second memory region; and
  storing a second portion of the lower priority compressed data in a fourth memory region of a second cache line contiguous with the first cache line.

24. The method of claim 23, further comprising:

receiving a read request;

determining if the read request is for the higher priority compressed data or the lower priority compressed data;
  upon determining the read request is for the higher priority compressed data, retrieving the first cache line from the first memory region and the second memory region; and
  upon determining the read request is for the lower priority compressed data, retrieving the first portion of the lower priority compressed data from the third memory region of the first cache line and the second portion of the lower priority compressed data from the fourth memory region of the second cache line.

25. The method of claim 24, wherein determining if the read request is for the higher priority compressed data or the lower priority compressed data is based on the logical memory address of the read request.

26. The method of claim 25, wherein the logical memory address of the read request is used as the physical memory address of the first cache line if the read request is for the higher priority compressed data.

27. The method of claim 25, further comprising retrieving a pointer indicating the physical memory address upon determining the read request is for the lower priority compressed data.

28. The method of claim 23, wherein the method is performed by a device selected from a group consisting of a set top box, a music player, a video player, an entertainment unit, a navigation device, a personal digital assistant (PDA), a fixed location data unit, a computer, a laptop, a tablet, a communications device, a mobile phone, server, or other similar devices.

* * * * *